July 23, 1935.  J. L. F. BAUER ET AL  2,009,248
BEET GATHERING AND BUNCHING MACHINE
Filed April 16, 1934   4 Sheets-Sheet 4
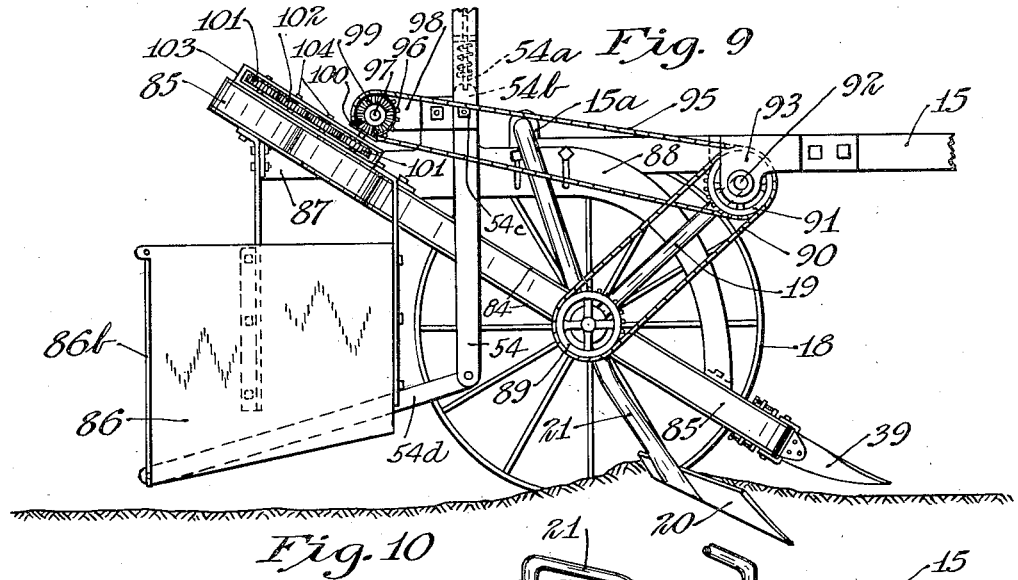
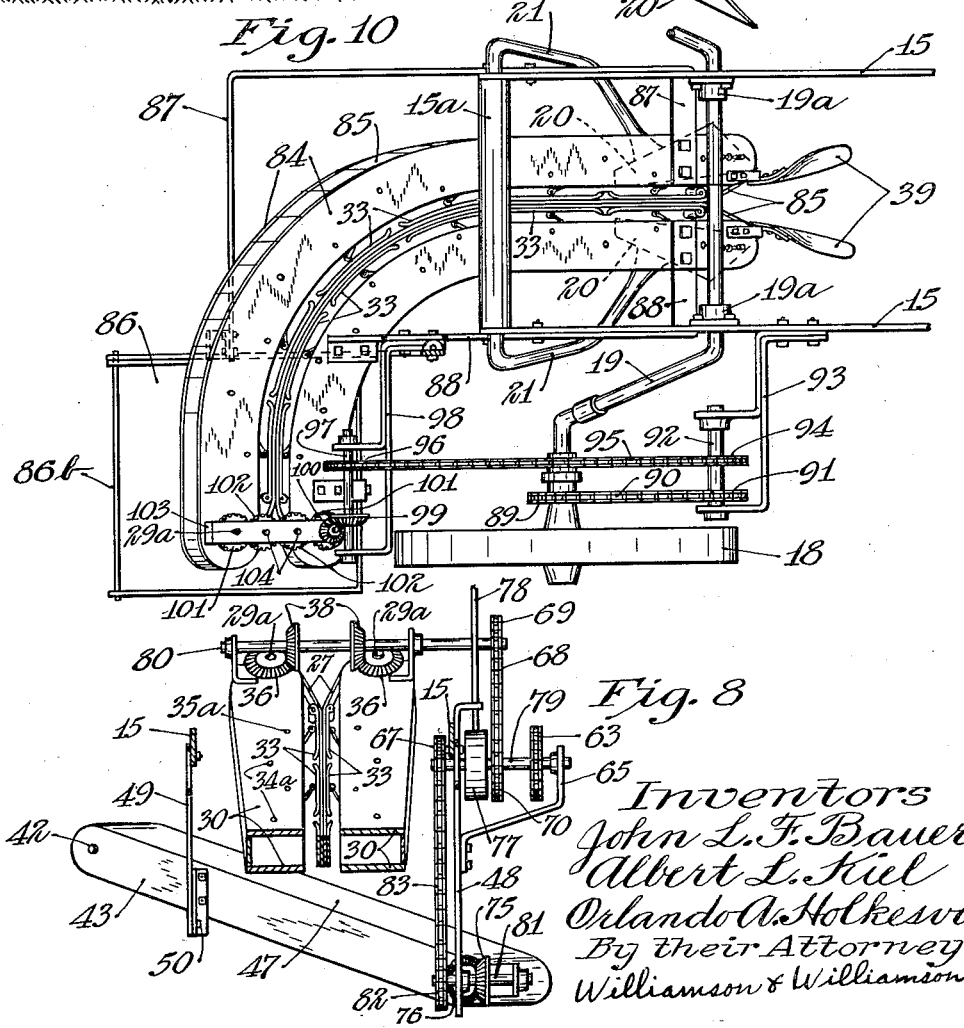

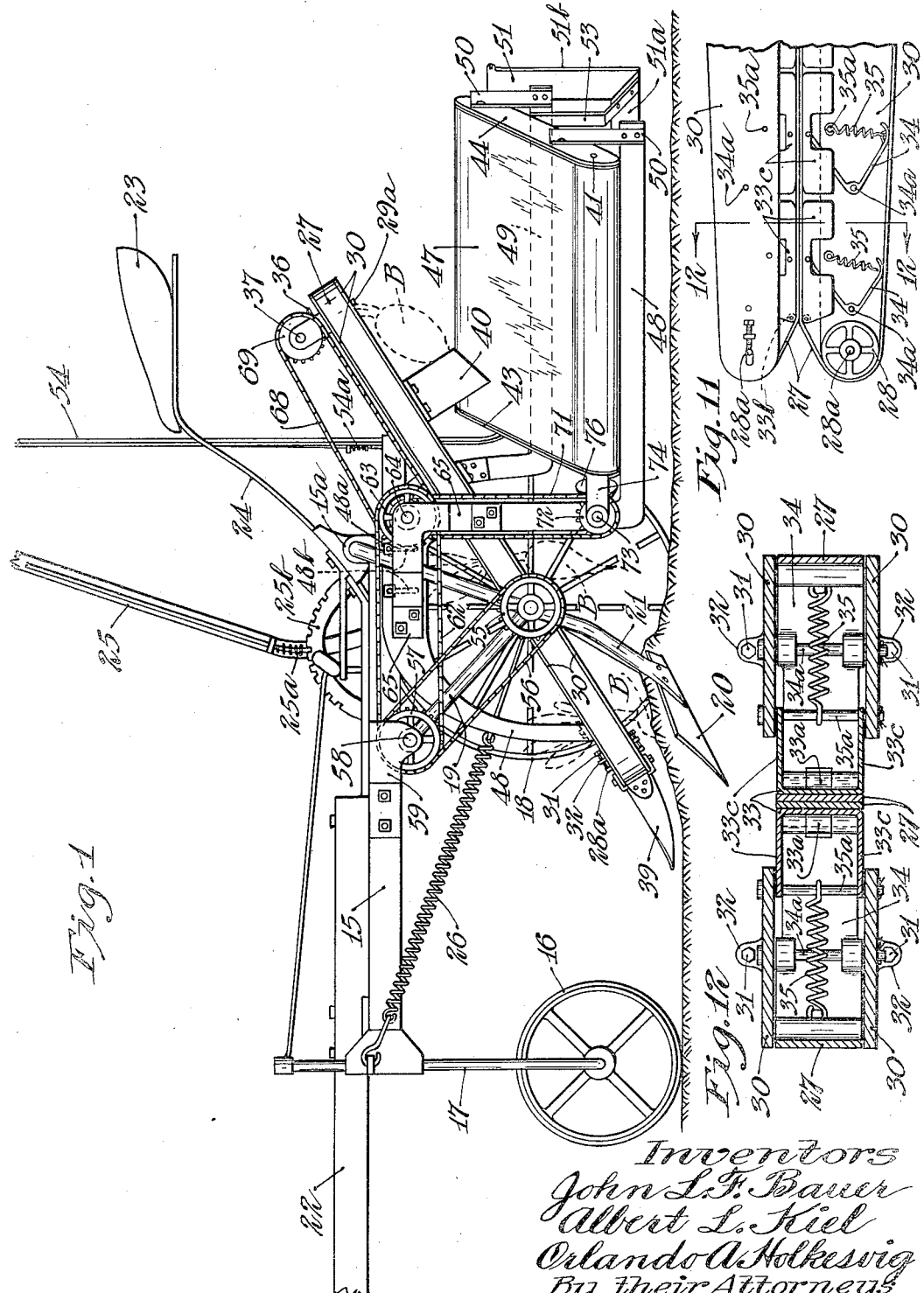

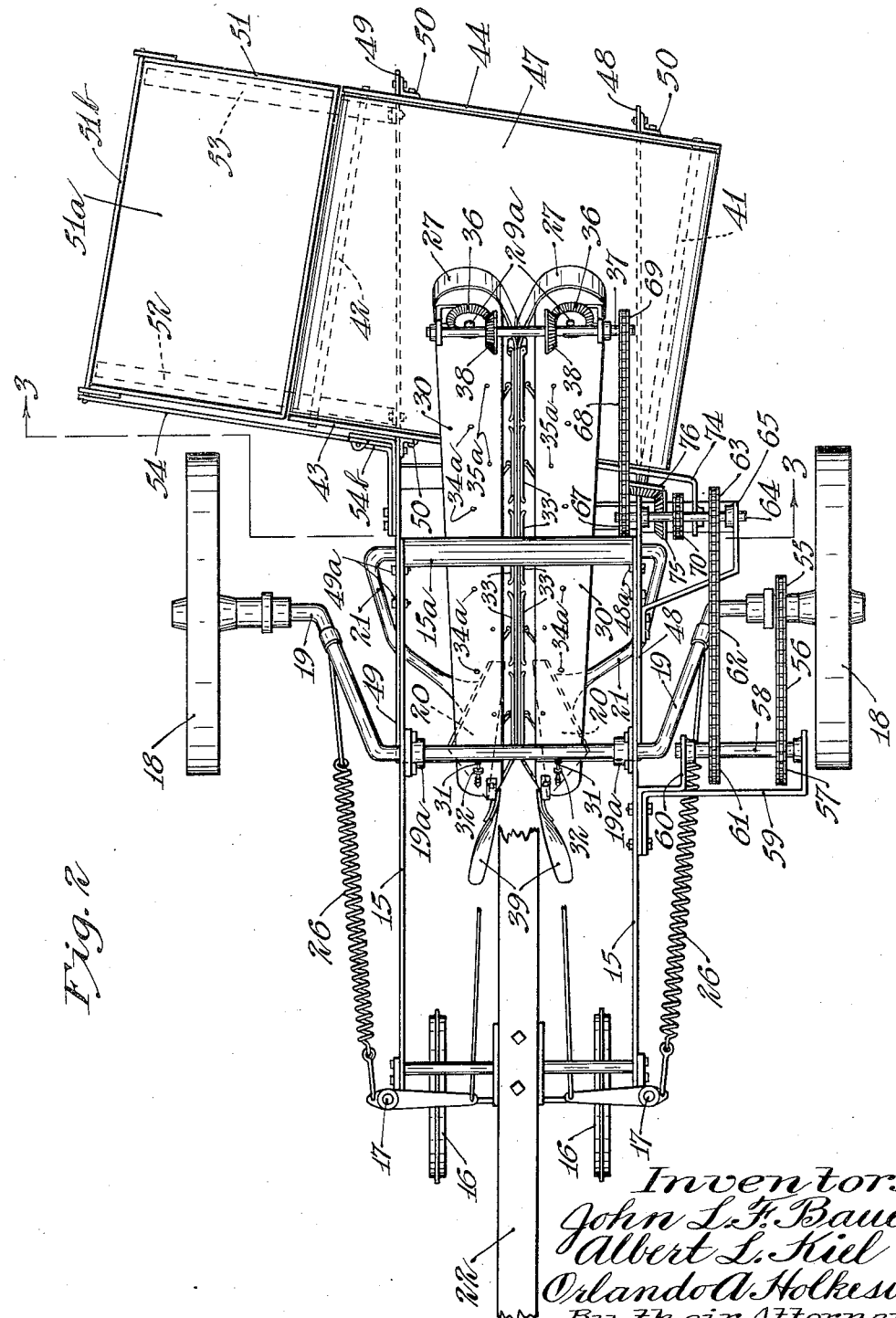

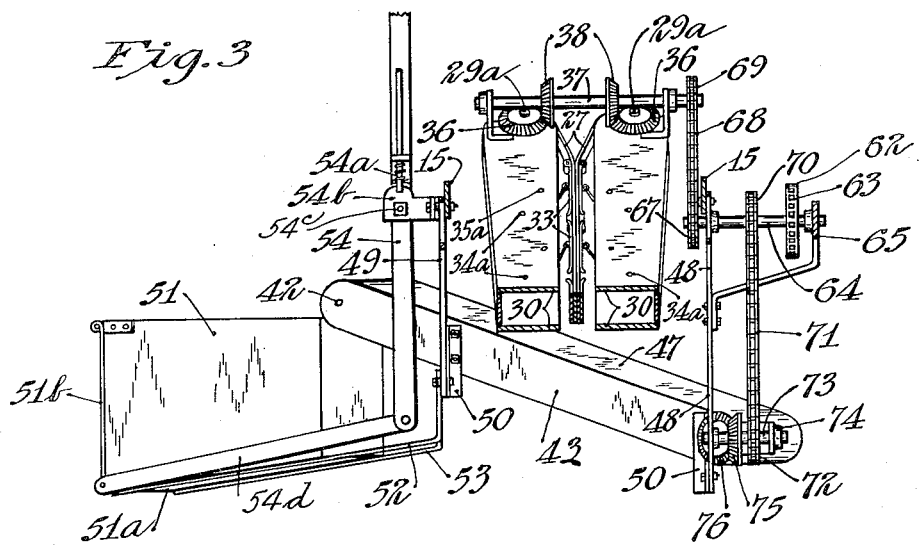
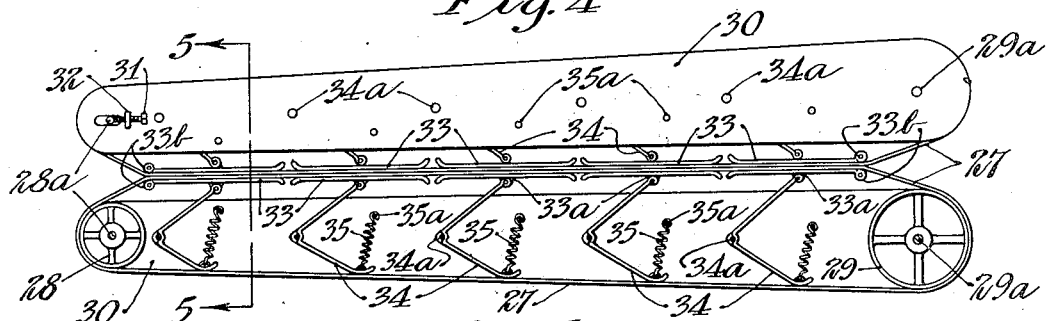
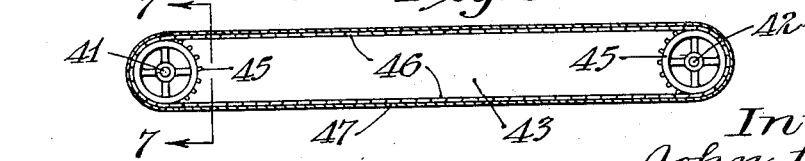

Patented July 23, 1935

2,009,248

UNITED STATES PATENT OFFICE 2,009,248

BEET GATHERING AND BUNCHING MACHINE

John L. F. Bauer, Fisher, and Albert L. Kiel and Orlando A. Holkesvig, Crookston, Minn.

Application April 16, 1934, Serial No. 720,782

8 Claims. (Cl. 55—108)

Our invention relates to beet lifters or pullers and particularly to mechanism for picking up, conveying and bunching beets as they are dug from the soil by the puller blades of the puller.

Beet pullers now available are designed only to loosen beets with respect to the soil and to raise the beets to the surface of the soil. Such a beet puller leaves a row of unearthed beets strewn behind it and it is necessary for men picking up beets so strewn to proceed along such a row picking beets up individually. No mechanism has heretofore been provided for picking up and bunching the beets as they are pulled and at intervals discharging an accumulated number of beets in a heap upon the ground.

An object of our invention is to provide mechanism in a beet puller for picking up beets as they are pulled, conveying said beets to a suitable part of the puller, temporarily storing beets which have been pulled and periodically discharging the beets accumulated.

Another object is to provide such mechanism wherein the tops of beets are gripped by a suitable conveying means as the beets are loosened from the soil and the beets are subsequently conveyed by said conveying means by their tops to suitable bunching and discharging means.

Yet another object is to provide such mechanism including elements for raising the tops of beets prior to and to facilitate gripping of the tops by the conveying means.

A further and more specific object is to provide such a mechanism in which a pair of closely spaced belts driven from a wheel of a beet puller cooperate to grip the top of a beet therebetween and to carry a beet by its top from one portion to another of the puller.

A still further object is to provide such a mechanism of simple, rugged, effective and inexpensive construction.

These and other objects and advantages of the invention will be more fully set forth in the following description made in connection with the accompanying drawings, in which like reference characters refer to similar parts throughout the several views, and in which:—

Fig. 1 is a side view of a beet puller having one form of our beet gathering and bunching mechanism incorporated thereon;

Fig. 2 is a top view;

Fig. 3 is a vertical sectional view taken along the line 3—3 of Fig. 2 as indicated by the arrows;

Fig. 4 is a top view of the longitudinal conveyor of our mechanism with a portion thereof removed;

Fig. 5 is a cross-sectional view taken along the line 5—5 of Fig. 4 as indicated by the arrows;

Fig. 6 is a longitudinal vertical sectional view of the cross conveyor of our mechanism;

Fig. 7 is a transverse sectional view taken along the line 7—7 of Fig. 6 as indicated by the arrows;

Fig. 8 is a vertical sectional view of another form of our invention;

Fig. 9 is a side view of portions of a beet harvester having incorporated therein still another form of our invention;

Fig. 10 is a top view of the structure shown in Fig. 9;

Fig. 11 is a top view of the longitudinal conveyor with guide plates of another and preferred form, and Fig. 12 is a cross-sectional view taken along the line 12—12 of Fig. 11 as indicated by the arrows.

Referring to the drawings, our beet picking and bunching mechanism is mounted on and cooperates with a conventional beet puller or harvester including a frame 15, front wheels 16, front wheel yokes 17, main wheels 18, main axle 19, puller blades 20, puller blade supports or lifting arms 21, draft pole 22, operator's seat 23 and seat support 24 assembled in a well-known conventional manner as shown in the drawings.

The medial portion of the main axle 19 is offset from the outer wheel-carrying portions thereof and is journaled in suitable bearings 19a secured to the frame 15 to provide for rotation of the main axle 19 through a limited angle relative to the frame 15 to raise and lower the frame 15 with respect to the main wheels 18 and the ground over which the main wheels 18 travel. A lever 25, provided with a releasable pawl 25a engaging an arcuate rack 25b mounted on the frame 15, is connected through suitable elements to the main axle 19 for use in adjusting the position of the axle and hence the height of the frame 15 above the ground. Springs 26, connected between elements attached to the frame 15 and suitable points on the axle 19 are employed to facilitate ease of operation in adjusting the axle 19.

The two puller blade lifting arms 21 are formed integrally and include a horizontally disposed medial portion journaled in a hollow member 15a at the rear of the frame 15 to permit adjustment of the position of the puller blade lifting arms 21 and the puller blades 20 carried thereby. Suitable releasable means is provided for locking the lifting arms in an adjusted position.

The above described structure is of conventional form and a structure embodying our invention is constructed as follows:

The form of our mechanism shown in Figs. 1 to 7 inclusive includes means for raising the leaves or tops of beets into substantially upwardly extending positions, a conveyor disposed in general longitudinally of the puller for conveying beets rearwardly and upwardly, a transverse conveyor for conveying beets discharged from the longitudinal conveyor to one side of the puller, and a hopper for receiving beets from the transverse conveyor arranged for periodic emptying of its contents onto the ground beside the harvester.

The longitudinal conveyor includes a pair of endless belts 27 each carried by and running over a pulley 28 at its forward end and carried by and running over a pulley 29 at its rearward end. The pulleys 28 and 29 are respectively mounted on short shafts 28a and 29a all of which are disposed parallel to each other. The pulleys 28 and 29 are so relatively located that one run of one of the belts 27 and one run of the other belt are closely adjacent each other and are respectively disposed in substantially parallel vertical planes.

The pulley 28 and pulley 29 associated with each of the belts 27 is located between a pair of parallel elongated plates 30 and each of the shafts 28a and 29a is journaled at its end portions in apertured portions of the respective plates 30 of the corresponding pair thereof. The shafts 28a are each provided at each end thereof with a belt-tightening means comprising an adjustment screw 31 running in a screw threaded aperture in an element 32 extending outwardly from the plate 30 and bearing against the inner side of the shaft 28a.

A series of smooth guide plates or pressure plates 33 having outwardly curved ends are arranged to bear against the inner side of each of the adjacent runs of the respective belts 27 to press the adjacent runs of the respective belts into contact with each other. A series of bell-cranks 34 are mounted in the space between the respective plates 30 of each pair thereof on pins 34a which are each journaled at respective ends in suitable apertures in the respective plates 30. One arm of each of the bell cranks 34 is pivotally connected to a lug 33a on the rear of one of the guide plates 33. The remaining arm of each of the bell cranks is formed into a curved element which engages the inner side of the run of the belt 27 opposite the run engaged by the guide plates 33. A tension spring is connected at one of its ends to the last mentioned arm of each of the bell cranks 34 and at its remaining end to a pin 35a which is anchored in apertures in the plates 30 so as to urge the bell crank 34 in a direction whereby it will press the guide plate 33 against the belt 27. The guide plate 33 at each end of each series thereof carries a revolubly mounted roller 33b at its end edge to facilitate free movement of the belts 27 as they enter and leave the space between the two parallel series of guide plates 33.

The shafts 29a are each provided at their upper end with a bevel gear 36 located above the uppermost one of the plates 30 and a suitably journaled shaft 37 carries a pair of bevel gears 38 thereon respectively engaged with the bevel gears 36. The gears 36 and 38 are so arranged that the two belts 27 will be driven at a common speed and in opposite directions whereby the adjacent runs of the respective belts will travel in the same direction.

The above described longitudinal conveyor is mounted in the frame 15 of the puller midway between the sides thereof and sloping upwardly and rearwardly with the end containing the pulleys 28 disposed forwardmost and a short distance above the forward ends of the puller blades 20. The longitudinal conveyor is firmly held in place by the brackets 48 and 49, to which the plates 30 thereof are respectively connected at the forward and medial portions of the conveyor. Each of the brackets 48 and 49 is attached to its respective side of the frame 15 by means of bolts 48a and 49a passing through suitable apertures in the frame 15 and vertically extending slots 48b and 49b in the medial and uppermost portions of the respective brackets whereby the brackets 48 and 49 and all parts supported therefrom may be adjusted in height when the bolts 48a and 49a are loosened.

A pair of forwardly diverging beet leaf or top lifting plates 39 are respectively secured at their rear ends to the forward end of the longitudinal conveyor described above and extend forwardly and downwardly therefrom. The forwardmost end of each of the lifting plates 39 is disposed substantially in a horizontal plane and each plate 39 is so twisted in shape, as is shown in the drawings, that the rearmost portion thereof is disposed substantially in a vertical plane.

A U-shaped beet tilting element 40 is secured by the flanged upper ends of its side members to the lower sides of the respective lower plates 30 of the longitudinal conveyor a short distance forwardly of the rear end of the longitudinal conveyor. The beet tilting element 40 is formed of a plate or flat strip of suitable material bent into the shape shown to provide a passageway between the side members thereof.

A second conveyor working transversely of the puller is located at the rear thereof to receive and convey beets dropped from the rear end of the longitudinal conveyor. This transverse conveyor includes a pair of shafts 41 and 42 disposed parallel to each other, respectively extending rearwardly and slightly toward the left from the rear end of the puller and respectively situated slightly outwardly of lines produced rearwardly from the respective side members of the frame 15 of the puller. Shaft 41 is located a substantial distance below the level of the frame 15 and is spaced only a moderate distance above the ground upon which the puller runs and shaft 42 is located only a short distance below the level of the frame 15.

Corresponding ends of the shafts 41 and 42 are journaled in an elongated plate 43 and the remaining end of each of the shafts 41 and 42 is journaled in a second similar plate 44. The plates 43 and 44 are parallel to each other, are disposed in vertical planes and form side enclosure plates for the transverse conveyor.

A pair of sprockets 45 are mounted on each of the shafts 41 and 42 in locations thereon adjacent the respective ends thereof and just inwardly of the plates 43 and 44. A continuous sprocket chain 46 extends between and runs over each aligned pair of sprockets 45 respectively located on the shafts 41 and 42 and a wide continuous belt 47 of flexible material extending in width across the space between the respective chains 46 is secured along its edges to the respective chains 46 to be carried by and move with the same.

The previously described brackets 48 and 49, secured to and supported from the frame 15 of the puller, carry vertical members 50 secured to and extending upwardly from suitable portions thereof and the vertical members 50 are attached to the outer sides of the plates 43 and 44 to support the same and the remaining parts of the transverse conveyor.

A hopper 51 is supported by brackets 52 and 53 attached to the conveyor supporting bracket 49 in position outwardly of the right hand side of the puller and suitably situated to receive material discharged from the right hand end of the transverse conveyor belt 47 through its open top. The floor 51a of the hopper 51 slopes slightly downwardly toward its outer edge. The outer side of the hopper 51 is swingably mounted at the upper edge thereof to form a discharge gate 51b whereby outward swinging thereof will permit emptying of material from the hopper 51.

By means of a bolt 54c, a double armed lever 54 is pivotally mounted at its medial portion on a member 54b attached to the frame 15 of the puller. The upper end of the lever 54 is suitably located to permit convenient operation thereof by an occupant of the seat 23 and the lower end is pivotally connected to one end of a link 54d. The remaining end of the link 54d is pivotally connected to the gate 51b. A releasable pawl 54a on the lever 54 engageable with a notch in the member 54b provides means for locking the lever 54 in such a position that the discharge gate 51b is closed.

The longitudinal and transverse conveyors previously described are both driven from the left main wheel 18 of the puller through a suitable system of sprockets, sprocket chains and gears arranged as follows:—

A sprocket 55 mounted on the hub of the right hand main wheel 18 is connected through a sprocket chain 56 to a sprocket 57 mounted on a countershaft 58 which is journaled in suitable brackets 59 and 60 attached to the frame 15 of the puller. A second sprocket 61 mounted on the countershaft 58 is connected through a second sprocket chain 62 to a sprocket 63 mounted on a second countershaft 64 which is journaled in suitable brackets 65 and 48 both of which are rigidly connected to the frame 15. A second sprocket 67 on the shaft 64 is connected through a sprocket chain 68 to a sprocket 69 mounted on the shaft 37 which drives the longitudinal conveyor.

A third sprocket 70 mounted on the shaft 64 is connected through a sprocket chain 71 to a sprocket 72 on a third countershaft 73 journaled in brackets 74 and 48 both of which are rigidly connected with the frame 15. A bevel gear 75 mounted on the shaft 73 is engaged with another bevel gear 76 which is mounted on the shaft 41 of the transverse conveyor.

The above described system of sprockets, chains and gears is so arranged that, when the wheel 18 is rotated in the direction corresponding to forward movement, of the puller, the upper run of the transverse conveyor belt 47 will move toward the right side of the puller to deliver material into the hopper 51 and the closely adjacent runs of the belts 27 of the longitudinal conveyor will move upwardly and rearwardly to deliver material onto the transverse conveyor belt 47.

*Operation*

In normal operation a beet puller of the type shown is drawn by means of the draft pole 22 along a row of beets in straddling relation to the row. The puller blades 20 loosen the earth about the beets and force the loosened earth and beets upwardly whereafter the beets lie exposed upon the ground in a continuous row and are later picked up by hand.

With our mechanism included in the beet puller, the operation of the puller is altered and improved as follows:

Before the puller blades 20 act upon a beet, the forward ends of the leaf or top lifting plates 39 are thrust under the spreading or drooping leaves of the beet B by movement of the puller and as this movement is continued the rearward portions of the lifting plates 39 deflect the leaves into substantially upwardly extending position. As the puller blades 20 start to act upon the beet B the upstanding group of leaves or top of the beet is caught between the convergently moving portions of the belts 27 of the longitudinal conveyor and become gripped between the belts 27 as the beet is freed from the soil by the action of the puller blades 20.

The beet B is carried rearwardly and upwardly by its top which is gripped between the rearwardly and upwardly moving runs of the belts 27. The guide plates 33 urged toward the closely spaced beet top gripping runs of the belts 27 by the springs 35, act to cause the belts 27 to tightly and firmly grip the beet tops throughout the movement of the beet tops from one end to the other of the conveyor. When cooperating pairs of guide plates 33 are forced farther apart than normal against the tension of the springs 35 by beet tops disposed between the belts 27, the curved ends of the bell cranks 34 opposite the ends attached to the guide plates 33 force the outer or returning runs of the belts 27 outwardly to absorb any slack therein and hence at all times maintain the belts in tightly stretched condition. As the beet B approaches the upper and rear end of the longitudinal conveyor it strikes the substantially horizontal beet tilting element 40 which retards the movement of the beet with respect to the top or leaves of the beet and thus tilts the beet. As the top of the beet reaches the portion of the longitudinal conveyor where the beet carrying runs of the belts 27 move divergently the beet top is released and the beet in its tilted position drops to the belt 47 of the transverse conveyor to lie on its side thereon.

The transverse conveyor carries beets received thereon toward the right hand side of the puller and, as the beets carried thereon reach the right hand end of the transverse conveyor, they will drop from the conveyor into the hopper 51.

When a desired number of beets have been accumulated in the hopper 51 the operator of the puller may move the lever 54 to open the discharge gate 51b of the hopper to permit discharge of the contents of the hopper onto the ground beside the puller. The result will be that, when the beets of a row thereof have been harvested, the beets harvested will have been deposited upon the ground in a series of widely spaced relatively large heaps and are ready to have their tops removed, after which they may be readily and economically loaded into a wagon or other conveyance for transportation to any desired destination.

Obviously, by loosening the bolts 48a and 49a, the brackets 48 and 49 and the beet lifting elements 39, the longitudinal conveyor, the transverse conveyor and the hopper 51 supported therefrom may all, as a unit, be raised and lowered with respect to the frame 15 and the ground within the limits imposed by the length of the slats 48b and 49b of the brackets 48 and 49.

The form of our invention shown in part in Fig. 8 is identical with the form described above with the exceptions that the hopper 51 is omitted and the mechanical transmission system for driving the transverse conveyor belt 47 is slightly rearranged to include a clutch unit 77 having an operating rod 78 by means of which the clutch 77 may be engaged or disengaged at the will of the operator of the puller.

The mechanical transmission system differs from that of the first described form only in the following details; a shaft 79 having a split therein and having the two portions thereof connected together by the clutch 77 is substituted for the shaft 64 of the first form. The shaft 37 of the first form is replaced by a longer shaft 80 and the sprocket 69 is mounted on the end thereof as shown. The sprocket chain 68 engaged with the sprocket 69 is engaged with the sprocket 70. The shaft 73 and the sprocket 72 are replaced by a longer shaft 81 with a sprocket 82 mounted on the inner end thereof. A sprocket chain 83 connects the sprockets 67 and 82.

In operation of this form of our invention the transverse conveyor is normally stationary while all other parts of the harvester are in motion. Beets delivered from the longitudinal conveyor belts 27 to the transverse conveyor belt 47 are accumulated upon the belt 47 until the desired number of beets have been accumulated. The clutch operating element 78 is then operated to engage the clutch 77 so that the transverse conveyor belt 47 will be driven to discharge the accumulated beets therefrom onto the ground beside the puller. When the accumulated beets have been discharged the clutch 77 is disengaged to stop movement of the transverse conveyor belt 47 in order to permit the accumulation of another load of beets on the belt 47.

The form of our invention illustrated in Figs. 9 and 10 of the drawings is similar to the first described form except that the transverse conveyor is omitted and the longitudinal conveyor is replaced by a conveyor of similar construction but so curved in form so that beets dropped from the discharge end thereof may fall directly into the hopper.

The differences in construction between this form and the first described form are as follows: The plates 30 of the longitudinal conveyor of the form first described are replaced in the conveyor of this form by plates 84 which are curved in shape as shown in Fig. 10. The belts 85 are longer than the belts 27 of the first form and a larger number of guide plates 33 are accordingly used. Other than explained above the conveyor is constructed in a manner similar to the longitudinal conveyor of the first form.

The hopper 86 is similar to the hopper 51 of the first form described but is so positioned that the discharge gate 86b opens rearwardly of the puller. The control lever 54 is rearranged in position to permit connection thereof with the discharge gate 86b through the link 54d in the same manner as that of the first described form.

Suitable brackets 87 and 88 are provided to support the hopper 86 and the conveyor. The brackets 87 and 88 are connected to the frame 15 for vertical adjustment with respect thereto in the same manner as the brackets 48 and 49 of the first described form.

Mechanical transmission means is provided to drive the conveyor from the right hand main wheel 18 of the puller. A sprocket 89 mounted on the hub of the wheel 18 is connected through a sprocket chain 90 to a second sprocket 91 mounted on a countershaft 92 journaled in a suitable bracket 93 attached to the frame 15. A third sprocket 94 is connected through a sprocket chain 95 to a fourth sprocket 96 mounted on a shaft 97 located adjacent the delivery end of the conveyor and journaled in a suitable bracket 98 connected through the bracket 88 to the frame 15. A bevel gear 99, mounted on the shaft 97 is meshed with a bevel gear 100 mounted on the nearest of the conveyor drive shafts 29a. The two conveyor drive shafts 29a are connected together by means of a spur gear 101 mounted on each of the shafts 29a and a pair of idler gears 102 respectively meshed with the spur gears 101 and meshed together. The shafts 29a are respectively journaled in suitable apertures in a bar 103 which is suitably supported from the plates 84. The idler gears 102 are revolubly mounted on respective ones of a pair of stub shafts 104 rigidly mounted on the bar 103.

The operation of the last described form of our invention is obvious in view of the previously described operation of the first and second embodiments of the invention.

Figs. 11 and 12 illustrate another and preferred form of guide plate 33 wherein flanges 33c are provided extending rearwardly from the plate 33 respectively at its upper and lower longitudinal edges. The flanges 33c are of sufficient width to extend to points between the plates 30 and are so spaced apart as to respectively loosely engage portions of the inner sides of the plates 30. The flanges 33c function to maintain the guide plate 33 in such an aligned position that its longitudinal edges will be parallel to the edges of the belts 27.

It is apparent that we have invented a novel, effective, rugged and easily operated beet picking and bunching mechanism adapted for cooperation with a beet puller and capable of picking up beets as they are unearthed by the puller, conveying the unearthed beets to a remote portion of the puller, temporarily storing the beets until a suitable quantity thereof is accumulated and then discharging the accumulated beets.

It will, of course, be understood that various changes may be made in the form, details, proportions and arrangement of the parts, without departing from the scope of our invention, which generally stated, consists in a device capable of carrying out the objects above set forth and in the novel parts and combinations of parts disclosed and defined in the appended claims.

What is claimed is:—

1. Means for conveying and delivering beets or the like comprising two groups of pulleys, a continuous belt carried by and running over each of said groups of pulleys, the respective groups of pulleys being so located relative to each other that one run of one belt and one run of the other belt are disposed closely adjacent and parallel to each other, means for so driving said belts that said adjacent runs will travel in a common direction at a common speed, whereby the top of a beet introduced between said adjacent runs at the convergently moving end thereof will be gripped between said runs and carried thereby to the divergently moving end thereof whereat said top will be released, transverse material conveying means situated to receive beets dropped from said adjacent belt runs and material receiving means situated to receive material from said transverse material conveying means.

2. Means for conveying and bunching vegetables having leafy tops comprising a pair of endless conveyors having substantially parallel closely spaced opposing runs, means for driving said conveyors in such manner that said opposing runs move in the same direction and at substantially the same speeds whereby the top of a vegetable introduced between said runs at the end thereof where said runs move convergently will be carried by said runs to the other end thereof and there be released, a third conveyor having a run adapted and located to receive the released vegetables, said third conveyor normally being stationary to accumulate released vegetables thereon and means for periodically driving said third conveyor to discharge accumulated vegetables therefrom.

3. Means for conveying and delivering beets or the like comprising two groups of pulleys, a continuous belt carried by and running over each group of pulleys, the respective groups being so located relative to each other that a pair of runs respectively of each of said belts are disposed closely adjacent and parallel to each other, means for driving said adjacent runs in a common direction at a common speed whereby the top of a beet introduced between said adjacent runs at their convergently moving end will be gripped therebetween, carried to the divergently moving end thereof and released, a normally stationary material conveyor having a run situated to receive beets so carried and released and means for periodically driving said conveyor to discharge from the end thereof beets accumulated thereon.

4. In combination with a beet puller consisting of a vehicle carrying blades for digging beets from the soil, means for picking up and delivering said beets comprising two groups of pulleys and belt guides, a continuous belt carried by and running over each group of pulleys and guides, said groups being so disposed relative to each other and each group being so arranged that one run of one belt and one run of the other belt are disposed closely adjacent and parallel to each other and extend longitudinally of said vehicle from a point substantially above said blades toward the rear of said vehicle and then extend transversely of said vehicle to a point adjacent one side thereof and means for driving both of said adjacent runs toward the rear and said side of said vehicle at a common speed whereby the top of a beet being freed from the soil by said blades will be received and gripped between forward ends of said adjacent runs and said runs will carry said beet by its top rearwardly of and then to said side of said vehicle to release and drop said beet at said side of said vehicle.

5. Means for conveying roots having leafy tops comprising a pair of endless conveyors having substantially parallel closely spaced opposing runs, means for driving said conveyors in such manner that said opposing runs move in the same direction and at substantially the same speeds whereby the top of a root introduced between said runs at the end thereof where said runs move convergently will be carried by said runs to the other end thereof with the root depending below its top and there be released, and horizontal tilting means disposed in the path of said depending root as it is moved by said conveyors whereby the movement of said root will be retarded with respect to the movement of the top thereof and said root, when released, will fall upon its side.

6. Means for conveying roots having leafy tops comprising a pair of endless conveyors having substantially parallel closely spaced opposing runs, means for driving said conveyors in such manner that said opposing runs move in the same direction and at substantially the same speeds whereby the top of a root introduced between said runs at the end thereof where said runs move convergently will be carried by said runs to the other end thereof with the root depending below its top and there be released to drop from said conveyors, receiving means positioned to receive a dropped root and horizontal tilting means disposed in the path of said depending root as it is moved by said conveyors whereby the movement of said root will be retarded relative to the movement of its top whereby said root will be disposed upon its side in a certain position when received by said receiving means.

7. Means for conveying vegetables having leafy tops, comprising a pair of endless conveyors having substantially parallel closely spaced opposing runs, means for driving said conveyors in such manner that said opposing runs move in a common direction at substantially like speeds and guide means carried by one arm of a bellcrank and urged against the inner side of the medial portion of each of said opposing runs to urge said runs toward each other whereby the top of a vegetable introduced between said opposing runs at the convergently moving ends thereof will be gripped between said runs and carried thereby to the other end thereof and there be released and the outer end portion of the remaining arm of said bellcrank engaging the inner side of the remaining run of the corresponding belt whereby said belts will be maintained in tightly stretched condition.

8. Means for conveying vegetables having leafy tops, comprising a pair of endless conveyors having substantially parallel closely spaced opposing runs, means for driving said conveyors in such manner that said opposing runs move in a common direction at substantially like speeds, guide means engaging and urged against the inner side of the medial portion of each of said opposing runs whereby the top of a vegetable introduced between said opposing runs at the convergently moving ends thereof will be gripped between said runs and carried thereby to the other end thereof and there be released, and a member carried by each of said guide means and engaging the inner side of the remaining run of the corresponding belt whereby said belts will be maintained in tightly stretched condition.

JOHN L. F. BAUER.
ALBERT L. KIEL.
ORLANDO A. HOLKESVIG.